(12) United States Patent
Baffes et al.

(10) Patent No.: US 7,941,854 B2
(45) Date of Patent: May 10, 2011

(54) METHOD AND SYSTEM FOR RESPONDING TO A COMPUTER INTRUSION

(75) Inventors: Paul T. Baffes, Austin, TX (US); John Michael Garrison, Austin, TX (US); Michael Gilfix, Austin, TX (US); Allan Hsu, Centerville, OH (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 10/313,732

(22) Filed: Dec. 5, 2002

(65) Prior Publication Data

US 2004/0111637 A1   Jun. 10, 2004

(51) Int. Cl.
  *G06F 12/14* (2006.01)
  *G08B 23/00* (2006.01)
(52) U.S. Cl. .............. 726/23; 726/22; 726/24; 713/164; 713/167
(58) Field of Classification Search ...... 726/23
See application file for complete search history.

(56) References Cited

U.S. PATENT DOCUMENTS

| | | | |
|---|---|---|---|
| 5,414,833 A | 5/1995 | Hershey et al. | |
| 5,452,442 A | 9/1995 | Kephart | |
| 5,542,024 A | 7/1996 | Balint et al. | |
| 5,546,507 A | 8/1996 | Staub | |
| 5,557,742 A * | 9/1996 | Smaha et al. | 726/22 |
| 5,684,957 A | 11/1997 | Kondo et al. | |
| 5,850,516 A | 12/1998 | Schneier | |
| 5,892,903 A | 4/1999 | Klaus | |
| 6,088,804 A | 7/2000 | Hill et al. | |
| 6,119,236 A | 9/2000 | Shipley | |
| 6,144,961 A | 11/2000 | de la Salle | |
| 6,178,509 B1 * | 1/2001 | Nardone et al. | 726/22 |

(Continued)

FOREIGN PATENT DOCUMENTS

| | | |
|---|---|---|
| EP | 1567926 B1 | 9/2006 |
| JP | 2002-024831 | 1/2002 |
| JP | 2002-342276 | 11/2002 |
| WO | WO 02/23808 A2 | 3/2002 |

OTHER PUBLICATIONS

Ghosh, Anup K. Wanken, James. Charron, Frank. "Detecting Anomalous and Unknown Intrusion Against Programs". Computer Security Applications Conference. Pub. Date: Dec. 1998. Relevant pp. 259-267. Found on the World Wide Web at: http://ieeexplore.ieee.org/stamp/stamp.jsp?tp=&arnumber=738646.*

(Continued)

*Primary Examiner* — William R Korzuch
*Assistant Examiner* — Jeremiah Avery
(74) *Attorney, Agent, or Firm* — Dillon & Yudell LLP (57) ABSTRACT

A method and system for managing an intrusion on a computer by graphically representing an intrusion pattern of a known past intrusion, and then comparing the intrusion pattern of the known intrusion with a current intrusion. The intrusion pattern may either be based on intrusion events, which are the effects of the intrusion or activities that provide a signature of the type of intrusion, or the intrusion pattern may be based on hardware topology that is affected by the intrusion. The intrusion pattern is graphically displayed with scripted responses, which in a preferred embodiment are presented in pop-up windows associated with each node in the intrusion pattern. Alternatively, the response to the intrusion may be automatic, based on a pre-determined percentage of common features in the intrusion pattern of the known past intrusion and the current intrusion.

38 Claims, 6 Drawing Sheets

U.S. PATENT DOCUMENTS

| | | | |
|---|---|---|---|
| 6,289,462 B1* | 9/2001 | McNabb et al. | 726/21 |
| 6,321,338 B1* | 11/2001 | Porras et al. | 726/25 |
| 6,347,374 B1* | 2/2002 | Drake et al. | 726/1 |
| 6,535,227 B1* | 3/2003 | Fox et al. | 715/736 |
| 6,609,205 B1* | 8/2003 | Bernhard et al. | 726/22 |
| 6,618,074 B1* | 9/2003 | Seeley et al. | 348/143 |
| 6,633,835 B1* | 10/2003 | Moran et al. | 702/190 |
| 6,678,734 B1* | 1/2004 | Haatainen et al. | 709/230 |
| 6,681,331 B1* | 1/2004 | Munson et al. | 726/23 |
| 6,775,657 B1* | 8/2004 | Baker | 706/45 |
| 6,801,940 B1* | 10/2004 | Moran et al. | 709/224 |
| 6,802,028 B1* | 10/2004 | Ruff et al. | 714/38 |
| 6,907,430 B2* | 6/2005 | Chong et al. | 707/100 |
| 6,931,552 B2* | 8/2005 | Pritchard et al. | 726/34 |
| 6,952,779 B1* | 10/2005 | Cohen et al. | 726/22 |
| 7,007,301 B2* | 2/2006 | Crosbie et al. | 726/23 |
| 7,020,697 B1* | 3/2006 | Goodman et al. | 709/223 |
| 7,089,428 B2* | 8/2006 | Farley et al. | 726/22 |
| 7,093,239 B1* | 8/2006 | van der Made | 717/135 |
| 7,234,168 B2* | 6/2007 | Gupta et al. | 726/25 |
| 2002/0161929 A1* | 10/2002 | Longerbeam et al. | 709/250 |
| 2003/0159070 A1* | 8/2003 | Mayer et al. | 713/201 |
| 2003/0208616 A1* | 11/2003 | Laing et al. | 709/236 |

OTHER PUBLICATIONS

Spafford, E.H. et al. "Intrusion Detection Using Autonomous Agents" Computer Networks, Elsevier Science Publishers B.V., Amsterdam, NL, vol. 34, No. 4, Oct. 2000, pp. 547-570, XP004304737 ISSN: 1389-1286.

Debar H. et al. "Towards a Taxonomy of Intrusion-Detection Systems" Computer Networks, Elsevier Science Publishers B.V., Amsterdam, NL, vol. 31, No. 8, Apr. 23, 1999, pp. 805-822, SP004304519 ISSN: 1389-1286.

Ruo Ando et al. "Real-time neural detection with network capturing", Technical Report of Information Processing Society of Japan, Information Processing Society of Japan, Feb. 15, 2002, vol. 2002, No. 12, p. 145-150.

Christina Warrender, Stephanie Forrest and Barak Pearlmutter; *"Detecting Instrusions Using System Calls: Alternative Data Models"*; Department of Computer Science, University of New Mexico, Albuquerque, NM 87131-1386; christy;forrest,bap@cs.unm.edu, Pub. Date: May 1999.

Christos Kaklamanis, Charalampos Konstantopoulos and Andreas Svolos; *"Parallel Processing Letters"*, World Scientific, Dec. 2000, vol. 10, No. 4, pp. 315-326.

* cited by examiner

METHOD AND SYSTEM FOR RESPONDING TO A COMPUTER INTRUSION

BACKGROUND OF THE INVENTION

1. Technical Field

The present invention relates in general to the field of data processing, and, in particular, to an improved data processing system and method for responding to a malicious intrusion using a graphical representation of the intrusion's effect.

2. Description of the Related Art

Most modern enterprise networks include means for access by remote users, typically via the Internet. This access is designed to afford authorized users interaction with the network for purposes such as e-commerce, sharing content, and other electronic activities. Because these networks are designed to be easily accessible to authorized users, they are also prone to access by unauthorized users, specifically those with malicious intent for accessing the network. This malice is presenting in the form of an "intrusion" by the user. An intrusion is defined as a malicious electronic access of the network or a computer in the network. Examples of intrusions include viruses, unauthorized data mining (sometimes called "hacking of files"), and distributed denial of service (DDOS) attacks, in which a computer system is overloaded by the intrusion such that real work can no longer be performed.

An intrusion event is defined as the result (effect) of an intrusion. Examples of an intrusion event are data files being corrupted or illegally copied, system/computer crashes and system/computer slow-downs.

Countering intrusions is typically the job of a security administrator, an information technology specialist who monitors, with the aid of risk management software, a computer system for intrusions. While there are many known methods for detecting an intrusion and the intrusion event, managing responses to the intrusion is extremely complicated. That is, while detection of an event is well known and may be automatic, management and response actions are typically taken manually. Because of the complex nature of an intrusion, it is difficult for the security administrator to evaluate what type of intrusion is occurring, and how to respond appropriately.

Thus, there is a need for a method and system to assist the security administrator in responding to detected intrusions, preferably in an manner that is automatic or semi-automatic.

SUMMARY OF THE INVENTION

The present invention is directed to a method and system for managing an intrusion on a computer by graphically representing an intrusion pattern of a known past intrusion, and then comparing the intrusion pattern of a current intrusion with the past intrusion. If the known and current intrusions have some or all common results (intrusion events or commonly affected hardware), then a security administrator can execute scripted responses to heal damage caused by the current intrusion, or at least prevent the current intrusion from causing any further damage.

The intrusion pattern may either be based on intrusion events, which are the effects of the intrusion or activities that provide a signature of the type of intrusion, or the intrusion pattern may be based on hardware topology that is affected by the intrusion.

The intrusion pattern is graphically displayed to the security administrator, who can respond by executing scripted responses, which in a preferred embodiment are presented in pop-up windows associated with each node in the intrusion pattern. Alternatively, the response to the intrusion may be automatic, based on a pre-determined percentage of common features in the intrusion pattern of the known past intrusion and the current intrusion.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
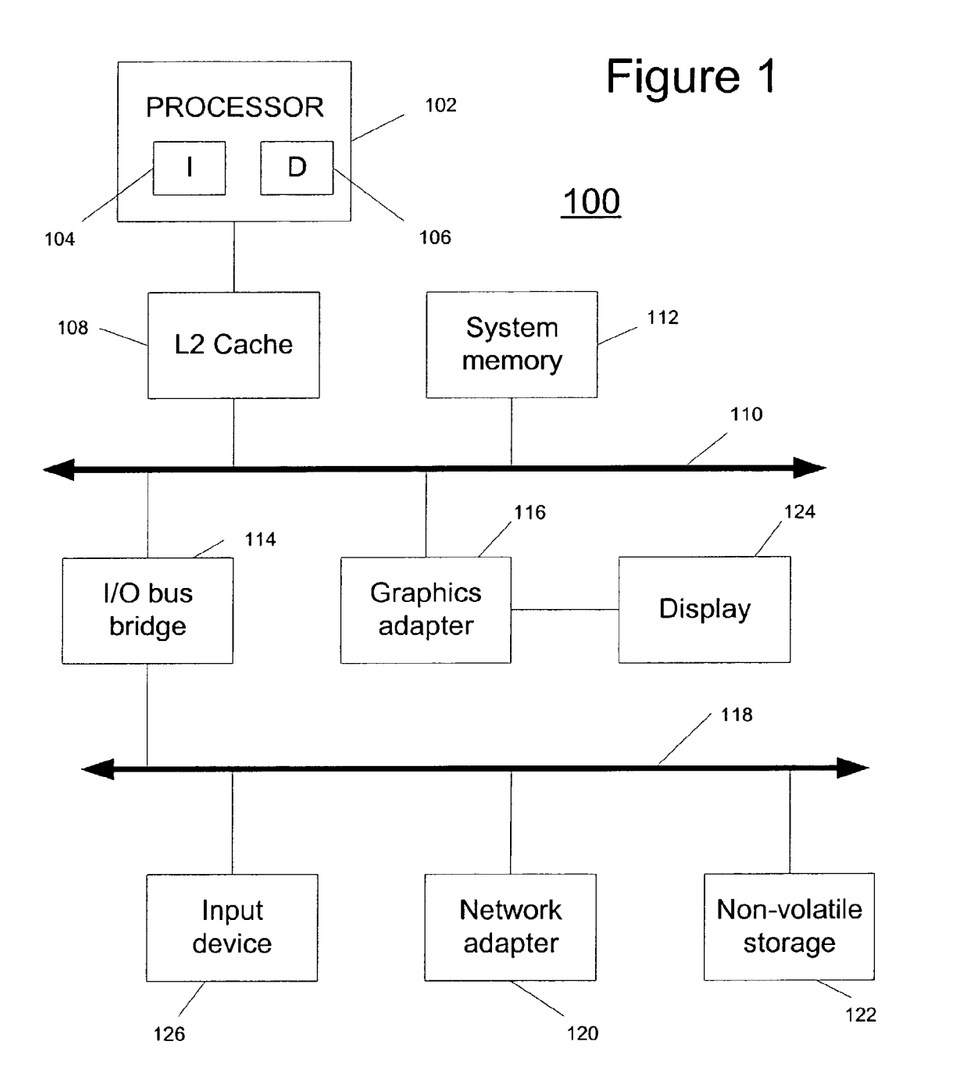
FIG. 1 depicts a block diagram of a data processing that may be used in the implementation of the present invention.

With reference now to the figures, and in particular with reference to FIG. 1, a data processing system 100, capable of communication with a network (not shown), is depicted in accordance with a preferred embodiment of the present invention. Data processing system 100 may be, for example, one of the models of personal computers or servers available from International Business Machines Corporation of Armonk, N.Y. Data processing system 100 may include only a single processor or may be a multiprocessor (MP) system including a plurality of processors. A single processor system is shown in the example depicted. A second processor (not shown) may be added to the system depicted, either with a separate L2 cache or sharing L2 cache 108 with processor 102. Processor 102 may be a superscalar reduced instruction set computing (RISC) processor including separate Level One (L1) instruction and data caches 104 and 106 within the processor.

Processor 102 is connected to Level Two (L2) cache 108. L2 cache 108 is connected to system bus 110 for data processing system 100. System memory 112 is also connected to system bus 112, as is Input/Output (I/O) bus bridge 114. I/O bus bridge 112 couples I/O bus 118 to system bus 110, relaying and/or transforming data transactions from one bus to the other. Other devices may also be connected to system bus 110, such as memory-mapped graphics adapter 116, which provides user interface information to a display 124.

I/O bus bridge 114 is connected to I/O bus 118, which may be connected to a variety of other devices such as an input device 126, which may be a conventional mouse, a trackball, a keyboard, or the like, and a non-volatile storage 122, such as a hard drive, a compact disk read-only memory (CD-ROM) drive, a digital video disk (DVD) drive, or similar like storage devices.

Also connected to I/O bus 118 is a networks adapter 120, which provides a logical interface with a network, which may be a local area network (LAN), wide area network (WAN), the Internet or other network that affords communication with other computers in the network with data processing system 100.

The exemplary embodiment shown in FIG. 1 is provided solely for the purpose of explaining the invention, and those skilled in the art will recognize that numerous variations are possible, both in form and function. For instance, data processing system 100 may include a sound card and audio speakers, other I/O devices and communication ports, and numerous other components. All such variations are believed to be within the scope and spirit of the present invention.

Figure 2A:
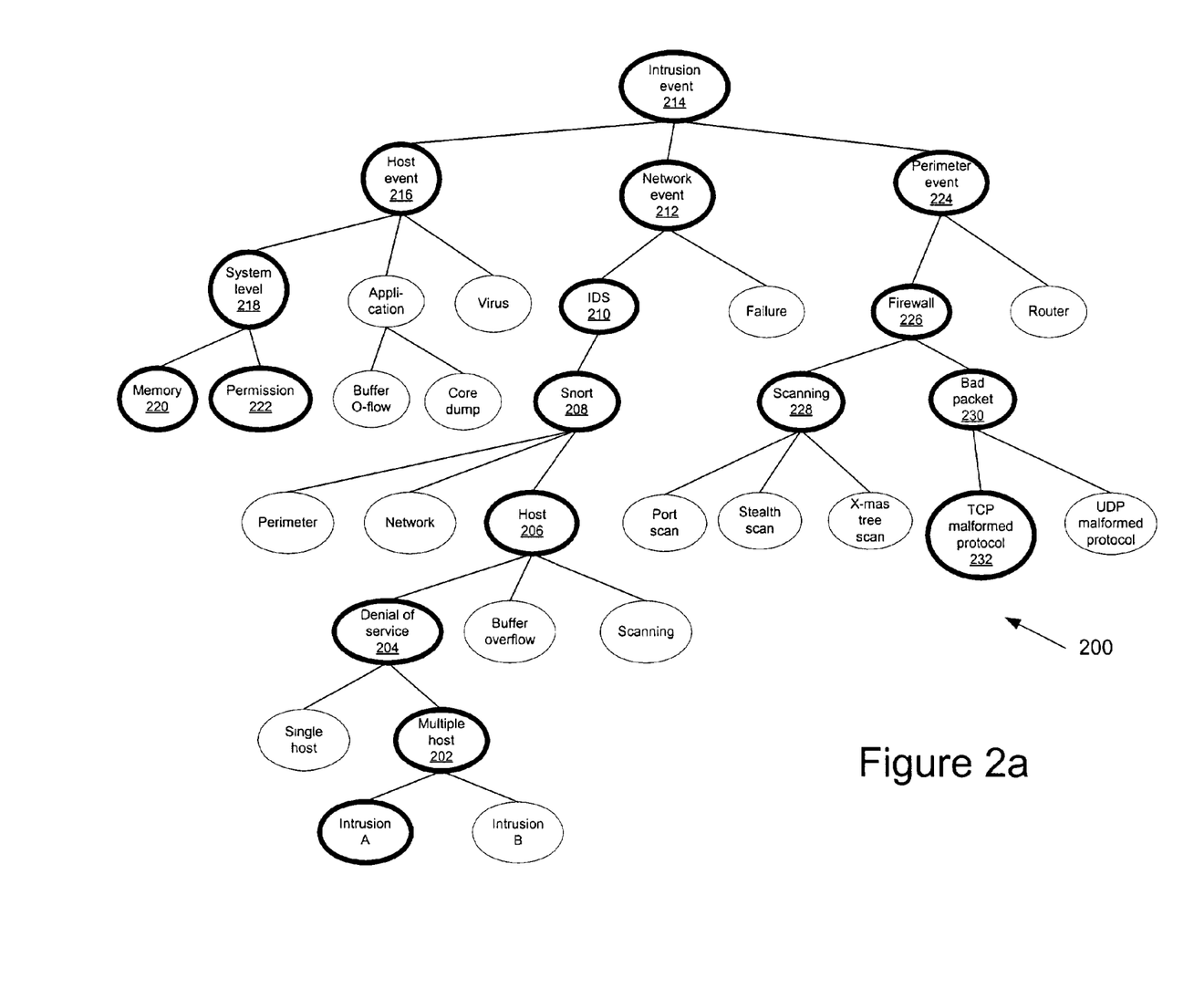
FIG. 2a illustrates an intrusion pattern based on intrusion events of a many different intrusions, including a known past intrusion.

With reference now to FIG. 2a, illustrated are possible intrusion events caused by many different intrusions. The intrusion events are defined as effects or activities initiated by the intrusion. While depicted in a tree manner, these intrusion events are best understood by realizing that the intrusion events illustrated are interrelated. For example, consider an intrusion path 200, which depicts intrusion events (shown in heavy circles) caused by an Intrusion A. Intrusion A, which for exemplary purposes may be a virus such as "Code Red," is an intrusion that affects multiple hosts 202 in creating a distributed denial of service 204 in a host computer 206. Intrusion A is shown as being detected by a Snort 208, which is an exemplary intrusion detection system, capable of performing real-time traffic analysis and packet logging on IP networks. Snort 208 can perform protocol analysis, content searching/matching and can be used to detect a variety of attacks and probes, such as buffer overflows, stealth port scans, common gateway interface (CGI) attacks, server message block (SMB) probes, operating system (OS) fingerprinting attempts, and the like.

Intrusion A may also trigger a response from an intrusion detection system (IDS) 210, which inspects all inbound and outbound network activity and identifies suspicious patterns that may indicate a network or system attack from someone attempting to break into or compromise the system. IDS 210 detected a network event 212, which in the present example is Intrusion A, which is a type of intrusion event 214 identified by and affecting the entire system.

Note that Intrusion A also affects other parts of the computer system, as illustrated by intrusion path 200. That is, Intrusion A also creates a host event 216, which at system level 218 affects both a memory event 220 as well as a permission event 222. Further, Intrusion A creates a perimeter event 224, which is detected by firewall 226 as being both a scanning event 228 and also having a bad packet 230 of data. The bad packet 230 is a transmission control protocol (TCP) malformed protocol packet 232, as depicted.

Figure 2B:
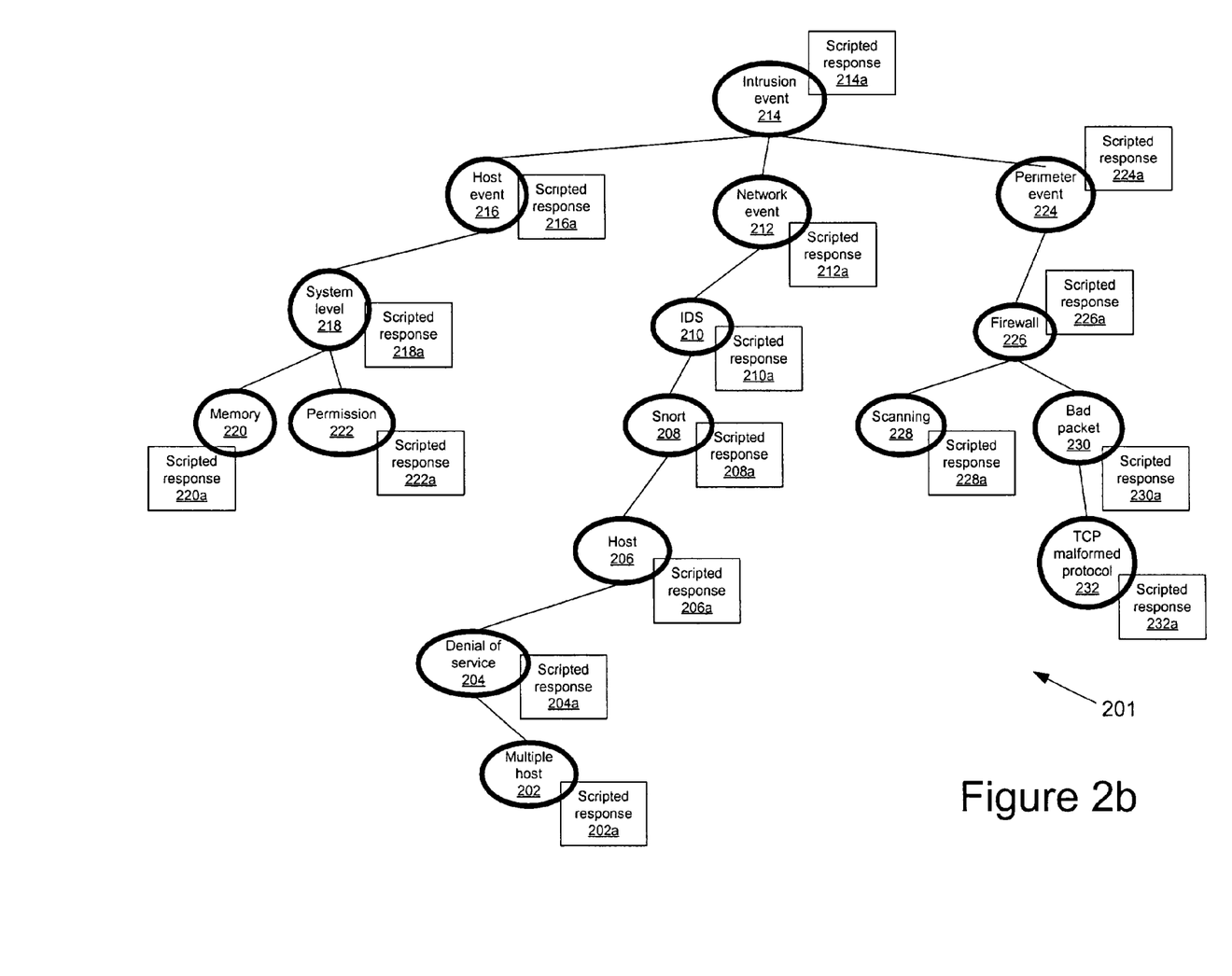
FIG. 2b depicts an intrusion pattern based on intrusion events of an unknown current intrusion that matches an intrusion pattern of a known past intrusion.

Thus, the pattern shown by intrusion path 200 having darkened heavy borders is a unique signature intrusion pattern for Intrusion A. Referring now to FIG. 2b, there is depicted an intrusion path 201 based on intrusion events of an unknown current intrusion. The cause of the current intrusion is initially unknown. However, since the intrusion pattern is identical to that of Intrusion A of FIG. 2a, the security administrator of the computer network or computer that has been intruded upon can recognize that the current intrusion is the same as, or at least acts in the same manner as, Intrusion A.

In a preferred embodiment of the present invention associated with each node is a scripted response, such as scripted response 204a associated with denial of service event 204. The scripted response is a pre-scripted code for handling the intrusion event. For example, scripted response 204a may be a program designed to isolate the intrusion that is overwhelming the computer system, and then disabling the intrusion. The scripted responses are depicted associated with each event describing node, and are preferably in an active window, such as a pop-up window, that initiates the scripted response simply by clicking on the active window with a mouse or similar pointing device. While scripted responses are depicted as single items, in an alternate preferred embodiment, a list of multiple suggested scripted responses are depicted and active in one or all of the nodes in the intrusion path 201. The multiple scripted responses are preferably depicted with rankings, with one of the scripted responses having a highest ranking based on historical success using the scripted response, the criticality of the intrusion, or other factors determined by the security administrator when developing a risk manager program for evaluating intrusions. For example, a risk manager program may determine that any intrusion that attacks mission critical data must be ensured of isolation, even if the isolation takes down non-affected parts of the computer system. In such a case, the highest suggested response would be to take down many areas of the computer system, and would be recommended as the highest suggested response.

Note that intrusion paths need not be identical to provide the security administrator information on how to respond to the intrusion. That is, if the known and unknown intrusions have a certain number of commonalities in their intrusion paths, the security administrator may initiate a response that will cure most, if not all, of the detrimental effects of the current unknown intrusion.

Figure 3:
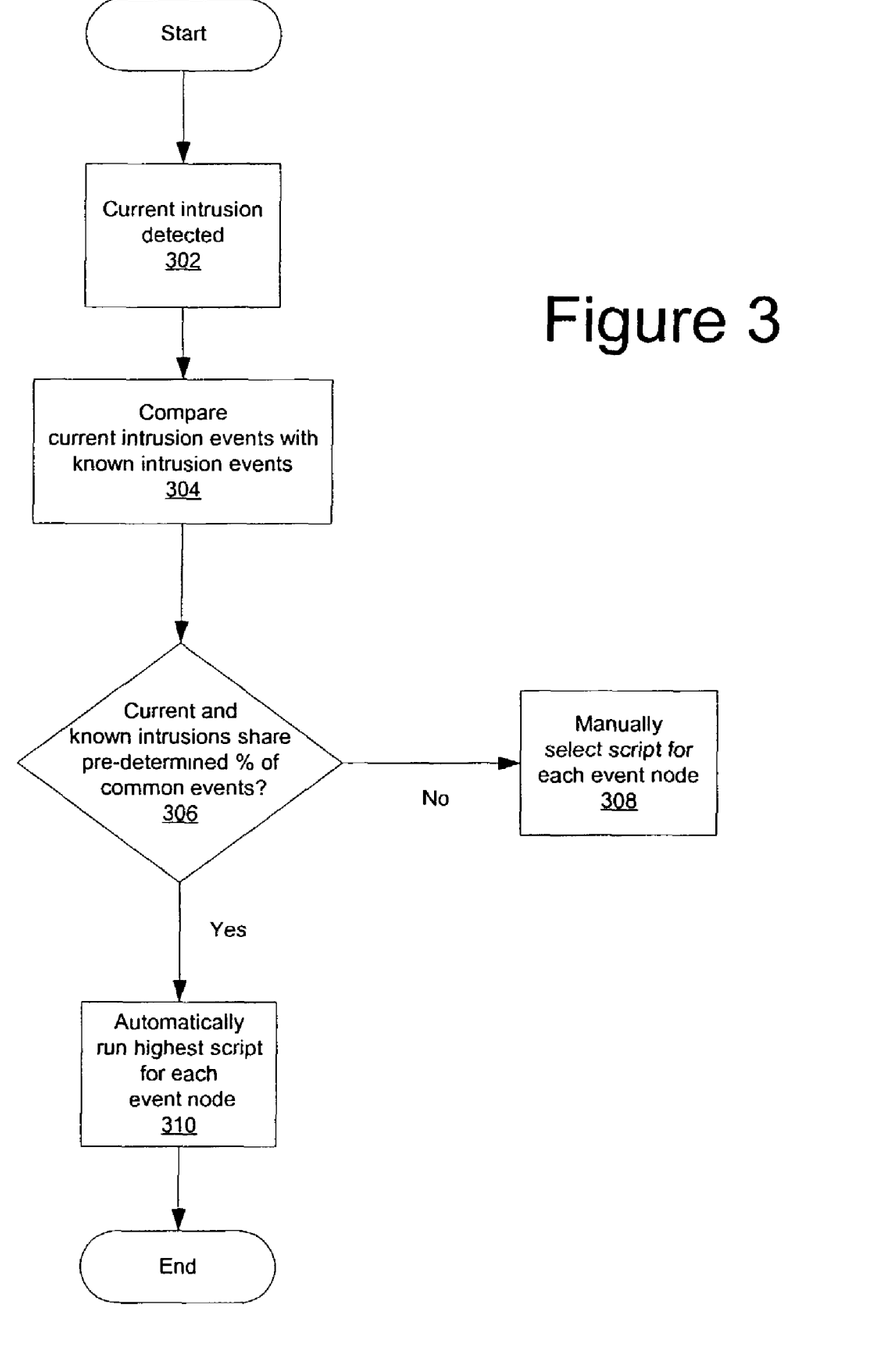
FIG. 3 is a flow chart of a preferred embodiment of the present invention for automatically running scripted responses for an unknown current intrusion.

In one embodiment of the present invention, each scripted response is manually selected by the security administrator for each node in the intrusion path 201. Alternatively, a setting may be selected to automatically initiate a highest suggested response for all nodes in response to an intrusion, as described in the flow chart of FIG. 3. As described in block 302, a current intrusion is detected, preferably by a risk manager capable of detecting an intrusion according to characteristics of the intrusion. Such characteristics may include known packets of mischievous header information or other data received, actions taken by software or hardware in the computer system characteristic of an intrusion, such as scanning all computers in a network for Internet protocol (IP) address, sudden computer performance degradation or CPU usage, and like events or conditions. The intrusion events of the current intrusion are compared with those of a known intrusion, as described in block 304. A determination is made, as illustrated at query block 306, as to whether a pre-determined percentage of common event nodes are found in both the unknown current intrusion and the known historical intrusion. That is, the intrusion pathways of the known and current intrusions are compared. If the known past and unknown current intrusions have a significant number of common event nodes, then scripted responses for all nodes are automatically run, as described for block 310. If there are not enough common event nodes between the known and unknown intrusions, then the security administrator is prompted to manually select a scripted response for each event node.

The determination to automatically run all scripted responses can also be determined by a risk management program on the computer system that classifies intrusions to determine whether an automatic response should be activated. For example, if the risk management program determines that the current intrusion is of a known classification type, or is or a known severity that could cause the entire system to crash, an automatic scripted response may be initiated. In a preferred embodiment, the severity of the intrusion is matched with a severity of the results of a scripted response. That is, a severe intrusion is matched to a scripted response that may have a severe impact on the system, such as preemptively bringing down a part of the system, but the severe impact may be justified due to the severe nature of the intrusion and the potential harm the intrusion may cause.

Similarly, if the risk management program has been designed to understand that the expected response time for the security administrator to respond is likely to be so long that significant damage is done to the system before the security administrator responds, an automatic scripted response may be initiated. Likewise, if a particular intrusion path has historically resulted in execution of specific scripted responses a significant number of times (or only once), then the risk management program can automatically initiate execution of the scripted responses based on this history.

Figure 4A:
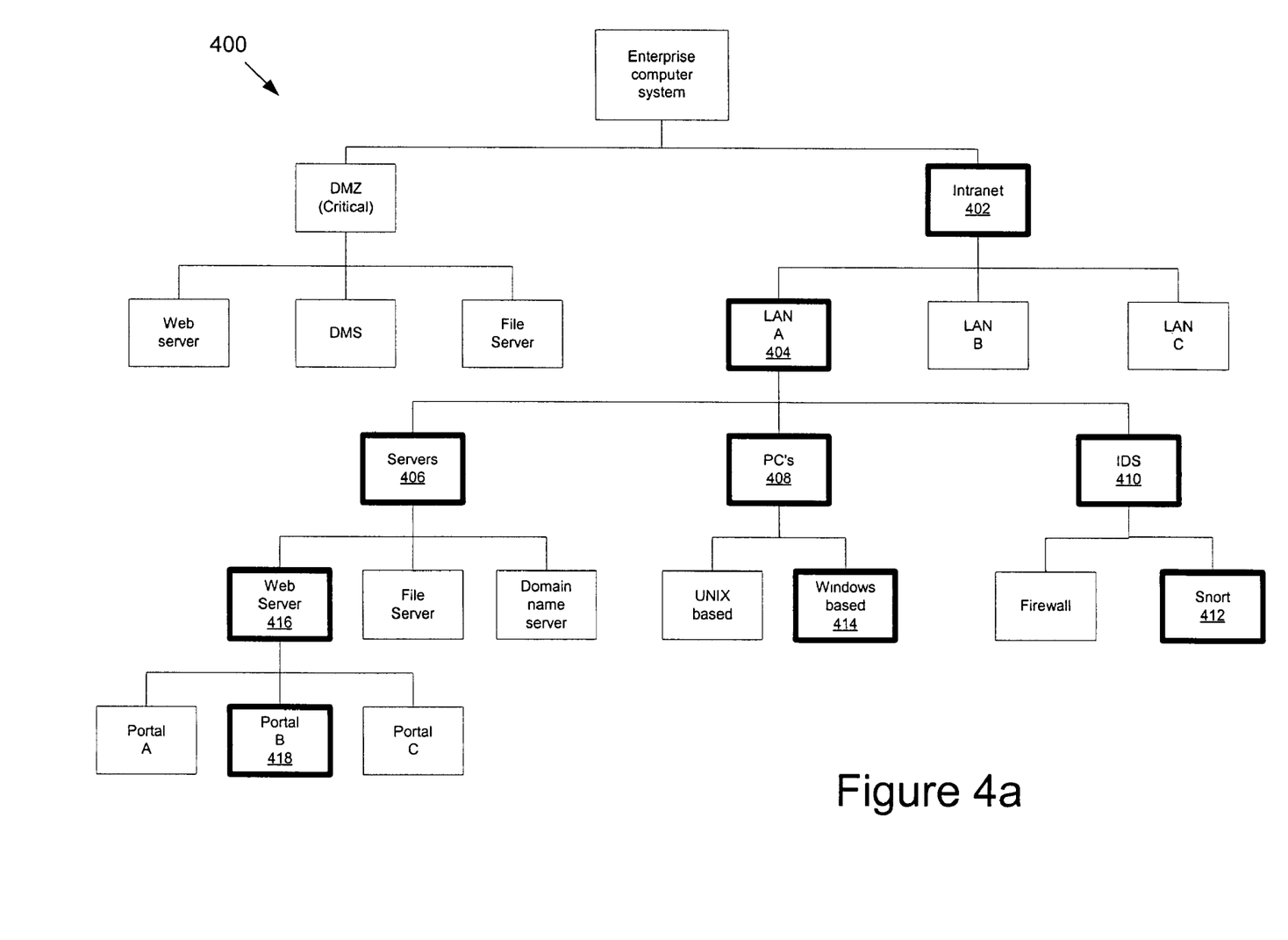
FIG. 4a illustrates an intrusion pattern based on affected hardware topology of a many different intrusions, including a known past intrusion.

In addition to common event patterns, as illustrated in FIGS. 2a and 2b, intrusions also have signatures regarding what hardware in a hardware topology is affected. With reference now to FIG. 4a, there is depicted hardware that may be affected by an intrusion. An intrusion path 400, identified in the figure by bold bordered boxes, identified hardware topology of a computer system that is affected by Intrusion A, described above in FIG. 2a. Thus, Intrusion A causes an anomaly in an enterprises computer system's intranet 402, which is affected by a local area network (LAN) A 404 in intranet 402. Within LAN A 404 are affected servers 406, personal computers (PC's) 408 and intrusion detection system (IDS) hardware 410. Within servers 406 is an affected web server 416, whose portal B 418 is also affected by Intrusion A. Similarly, all PC's running Windows® based operating systems are affected and shown as Windows® based 414 PC's. Likewise, IDS hardware 410 running Snort enabled hardware 412 registers an event that Intrusion A has been detected. Thus, the hardware shows a signature intrusion pattern in a manner analogous to that of the intrusion event intrusion pattern described above with FIGS. 2a and 2b.

Figure 4B:
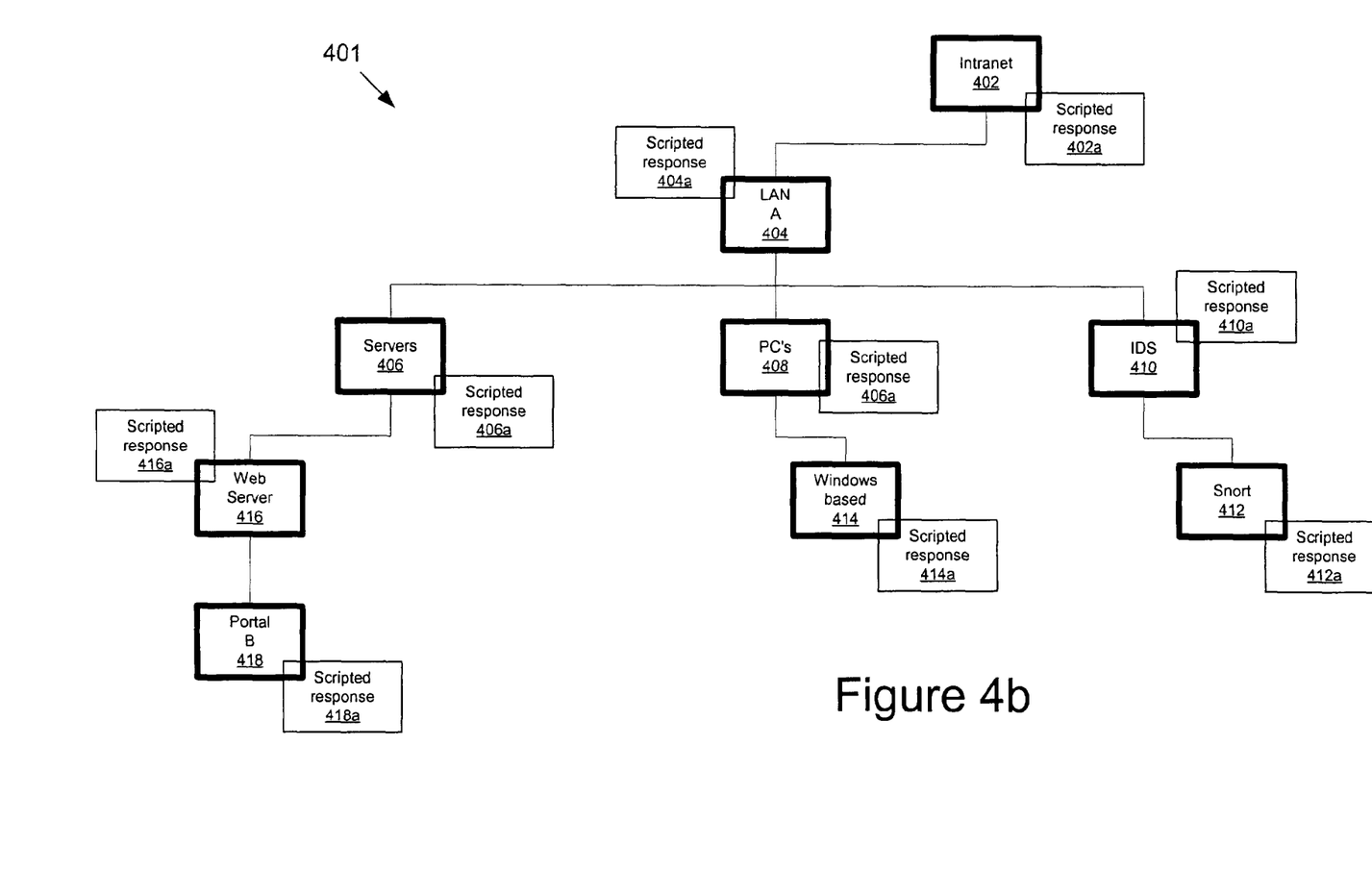
FIG. 4b depicts an intrusion pattern based on affected hardware topology of an unknown current intrusion that matches an intrusion pattern of a known past intrusion.

With reference now to FIG. 4b, the hardware topology intrusion path 401 depicts that pattern caused by Intrusion A. When a current unknown intrusion occurs having a same or similar pattern as shown by hardware topology intrusion path 401, the security administrator responds in a manner similar to that described for the intrusion event intrusion pattern above. Thus, each event node in the hardware topology intrusion path 401 includes an associated active window containing scripted response(s), which are analogous to those described above in describing FIGS. 2a and 2b. As with scripted responses for intrusion events, the scripted responses described in the hardware topology intrusion path 401 may be singular, as depicted, or may be a list of suggested scripted responses, which list is preferably scored such that a highest scripted response is advocated. The scripted responses may be initiated manually or automatically in a manner analogous to that described above for intrusion event intrusion paths.

As with the graphical display of intrusion events described and depicted above with FIGS. 2a and 2b, intrusion paths of known and unknown intrusions need not be identical to provide the security administrator information on how to respond to the intrusion. That is, if the known and unknown intrusions have a certain number of commonalities in their intrusion paths, the security administrator may initiate a response that will cure most, if not all, of the detrimental effects of the current unknown intrusion.

The scripted response to the intrusion may be initiated by the security administrator either locally or remotely, in response to a notification. For example, the security administrator may receive a notification on a cellular phone or personal digital assistant (PDA) informing her of the intrusion event. The security administrator may then activate some or all of the scripted responses electronically by clicking an interactive window in the PDA, such that the input is recognized by a risk management program for the computer system to initiate the requested scripted response(s).

The present invention, therefore, presents a method and means for creating and graphically representing an intrusion pattern of a known intrusion for comparison to an current intrusion, which may be known or unknown by the risk management program of the computer system. After the current intrusion is identified according to its signature intrusion path which is graphically represented, scripted responses are initiated to respond to and control the intrusion. The scripted responses may be based on historical data for the known intrusion. The known and current intrusions may be the same or different, and suggested scripted responses are graphically suggested in association with some or all of the event or hardware nodes in the intrusion path affected by the current intrusion. The scripted response may be a single choice for each event/hardware node in the intrusion path, or may be chosen from a list of ranked suggested scripted responses.

Although aspects of the present invention have been described with respect to a data processing system and server farm, it should be understood that at least some aspects of the present invention may alternatively be implemented as a program product for use with a data storage system or computer system. Programs defining functions of the present invention can be delivered to a data storage system or computer system via a variety of signal-bearing storage media, which include, without limitation, non-writable storage media (e.g. CD-ROM), and writable storage media (e.g. a floppy diskette, hard disk drive, read/write CD-ROM, optical media). It should be understood, therefore, that such signal-bearing storage media, when encoding computer readable instructions that direct method functions of the present invention, represent alternative embodiments of the present invention. Further, it is understood that the present invention may be implemented by a system having means in the form of hardware, software, or a combination of software and hardware as described herein or their equivalent While the invention has been particularly shown and described with reference to a preferred embodiment, it will be understood by those skilled in the art that various changes in form and detail may be made therein without departing from the spirit and scope of the invention.

What is claimed is:

1. A method for managing an intrusion on a computer, the method comprising:

visually representing on a computer display a known intrusion path of a known intrusion of hardware of a computer such that the known intrusion path is visually depicted on a display of the computer as a graphical representation of all hardware in a hardware topology of the computer that was previously infected by the known intrusion, wherein the graphical representation of the known intrusion path includes a scripted response that is visually displayed in association with at least one of the hardware displayed in the known intrusion path graphical representation;

visually representing on the computer display a current intrusion path of a current intrusion of the computer such that the current intrusion path is visually depicted on the computer display using a graphical representation of all hardware in the hardware topology of the computer that is currently infected by the current intrusion;

matching the current intrusion to the known intrusion according to at least one common node in the visual graphical representations of the displayed graphical intrusion paths of the known intrusion and the current intrusion; and responsive to matching the known intrusion and the current intrusion, initiating the scripted response, wherein the scripted response is capable of responding to the current intrusion.

2. The method of claim 1, wherein the intrusion paths are based on intrusion events.

3. The method of claim 1, wherein the hardware infected by the known intrusion are infected computers on a network.

4. The method of claim 1, further comprising:

associating a list of suggested scripted responses with each node in the current intrusion path graphical representation, wherein each suggested scripted response is made up of a set of instructions that is different from instructions used in all other suggested scripted responses; and selecting one of the suggested scripted responses for each node in the current intrusion path graphical representation.

5. The method of claim 4, further comprising:

ranking the suggested scripted responses to create ranked suggested scripted responses;

depicting, at each node, the ranked suggested scripted responses along with a corresponding ranking for each of the ranked suggested scripted responses;

selecting a highest ranked suggested scripted response for at least one node in the current intrusion path graphical representation; and executing the highest ranked suggested scripted response.

6. The method of claim 5, wherein each ranked suggested scripted response addresses a same intrusion, and wherein the highest ranked suggested scripted response has a highest level of historical success for neutralizing the same intrusion when compared to other ranked suggested scripted responses depicted at a node.

7. The method of claim 5, wherein each ranked suggested scripted response is for a different intrusion, and wherein the highest ranked suggested scripted response is for an intrusion that has a highest potential for threatening mission critical data compared to other intrusions that are handled by other ranked suggested scripted responses depicted at a node.

8. The method of claim 1, further comprising:

automatically performing the method described in claim 1 according to an expected response time for manually initiating the scripted response, wherein the method is automatically performed if waiting the expected response time to manually initiate the scripted response would result in damage being done to the computer.

9. The method of claim 1, further comprising:

automatically performing the method described in claim 1 based on a severity of the current intrusion, wherein the scripted response is at a severity level appropriate to the severity of the current intrusion.

10. The method of claim 1, further comprising:

determining how many common nodes are found in the known intrusion path and the current intrusion path;

in response to a quantity of common nodes reaching a predetermined quantity, automatically running scripted responses for all nodes in the current intrusion path; and in response to the quantity of common nodes being less than the predetermined quantity, prompting a security administrator to manually select a scripted response for each event node in the current intrusion path.

11. The method of claim 1, further comprising:

notifying a remote receiver of the current intrusion; and remotely initiating the scripted response in response to the remote notification of the current intrusion.

12. A system for managing an intrusion on a computer, the system comprising:

a memory subsystem; and a processor coupled to the memory subsystem, wherein the processor is configured for:

visually representing on a computer display a known intrusion path of a known intrusion of hardware of a computer such that the known intrusion path is visually depicted on the computer display as a graphical representation of all hardware in a hardware topology of the computer that was previously infected by the known intrusion, such that the graphical representation of the known intrusion path includes a scripted response that is visually displayed in association with at least one of the hardware displayed in the known intrusion path graphical representation;

visually representing on the computer display a current intrusion path of a current intrusion of the computer such that the current intrusion path is visually depicted on the computer display using a graphical representation of all hardware in the hardware topology of the computer that is currently infected by the current intrusion;

matching the current intrusion of the computer to the known intrusion according to at least one common node in the visual graphical representations of the displayed graphical intrusion paths of the known intrusion and the current intrusion; and responsive to matching the known intrusion and the current intrusion, initiating the scripted response, wherein the scripted response is capable of responding to the current intrusion.

13. The system of claim 12, wherein the intrusion paths are based on intrusion events.

14. The system of claim 12, wherein the known intrusion and the current intrusion are the same, and wherein the scripted response for the current intrusion is based on historical data for the known intrusion.

15. The system of claim 12, wherein the known intrusion and the current intrusion are different, and wherein the scripted response for the current intrusion is based on historical data for the known intrusion.

16. The system of claim 12, wherein the current intrusion is graphed in a current intrusion path graphical representation, wherein the processor is further configured for:

associating a list of suggested scripted responses with each node in the current intrusion path graphical representation; and selecting one of the suggested scripted responses for each node in the current intrusion path graphical representation.

17. The system of claim 16, wherein the processor is further configured for:

ranking the suggested scripted responses to create ranked suggested scripted responses: and selecting a highest ranked suggested scripted response for each node in the current intrusion path graphical representation.

18. The system of claim 17, wherein the processor is further configured for selecting contemporaneously the highest ranked suggested scripted response for all nodes in the current intrusion path graphical representation.

19. The system of claim 17, wherein each ranked suggested scripted response is for a different intrusion, and wherein the highest ranked suggested scripted response is for an intrusion that has a highest level of threatening mission critical data compared to other intrusions that are handled by other ranked suggested scripted responses depicted at a node.

20. The system of claim 12, wherein the processor is further configured for:
automatically performing the method described in claim 12 according to an expected response time for manually initiating the scripted response, wherein the method is automatically performed if waiting the expected response time to manually initiate the scripted response would result in damage being done to the computer.

21. The system of claim 12, wherein the processor is further configured for:
automatically performing the method described in claim 12 based on a severity of the current intrusion, wherein the scripted response is at a severity level appropriate to the severity of the current intrusion.

22. The system of claim 12, wherein the processor is further configured for:
automatically performing the method described in claim 12 based on a type classification of the current intrusion.

23. The system of claim 12, wherein the processor is further configured for:
notifying a remote receiver of the current intrusion; and
remotely initiating the scripted response in response to the remote notification of the current intrusion.

24. The system of claim 23, wherein the remote receiver is a wireless device.

25. A non-transitory computer usable medium for managing a virus on a computer, the non-transitory computer usable medium, comprising:
computer program code for visually representing on a computer display a known intrusion path of a known intrusion of hardware of a computer such that the known intrusion path is visually depicted on a display of the computer as a graphical representation of all hardware in a hardware topology of the computer that was previously infected by the known intrusion, such that the graphical representation of the known intrusion path includes a scripted response that is visually displayed in association with at least one of the hardware displayed in the known intrusion path graphical representation;
computer program code for visually representing on the computer display a current intrusion path of a current intrusion of the computer such that the current intrusion path is visually depicted on the computer display using a graphical representation of all hardware in the hardware topology of the computer that is currently infected by the current intrusion;
computer program code for matching the current intrusion of the computer to the known intrusion according to at least one common node in the visual graphical representations of the displayed graphical intrusion paths of the known intrusion and the current intrusion; and
computer program code for, responsive to the matching of the known intrusion and the current intrusion, initiating the scripted response, which is capable of responding to the current intrusion, wherein the computer usable medium is a computer usable storage medium.

26. The non-transitory computer usable medium of claim 25, wherein an intrusion pattern is based on intrusion events.

27. The non-transitory computer usable medium of claim 25, wherein the known intrusion and the current intrusion are the same, and wherein the scripted response for the current intrusion is based on historical data for the known intrusion.

28. The non-transitory computer usable medium of claim 25, wherein the known intrusion and the current intrusion are different, and wherein the scripted response for the current intrusion is based on historical data for the known intrusion.

29. The non-transitory computer usable medium of claim 25, wherein the current intrusion is graphed in a current intrusion path graphical representation, the non-transitory computer usable medium further comprising:
computer program code for associating a list of suggested scripted responses with each node in the current intrusion path graphical representation, wherein each suggested scripted response is different from all other suggested scripted responses; and
computer program code for selecting one of the suggested scripted responses for each node in the current intrusion path graphical representation.

30. The non-transitory computer usable medium of claim 29, further comprising:
computer program code for ranking the suggested scripted responses to create ranked suggested scripted responses;
computer program code for depicting, at each node, the ranked suggested scripted responses; and
computer program code for selecting a highest ranked suggested scripted response for at least one node in the current intrusion path graphical representation.

31. The non-transitory computer usable medium of claim 30, wherein each ranked suggested scripted response addresses a same intrusion, and wherein the highest ranked scripted response has a highest level of historical success for resolving the same intrusion when compared to other ranked suggested scripted responses depicted at a node.

32. The non-transitory computer usable medium of claim 31, wherein each ranked suggested scripted response is for a different intrusion, and wherein the highest ranked suggested scripted response is for an intrusion that has a highest level of threatening mission critical data compared to other intrusions that are handled by other ranked suggested scripted responses depicted at a node.

33. The non-transitory computer usable medium of claim 25, further comprising:
computer program code for automatically performing the steps described in claim 25 according to an expected response time for manually initiating the scripted response, wherein the steps are automatically performed if a response time, for a manual response to the current intrusion, is so long that damage is done to the computer before the manual response is executed.

34. The non-transitory computer usable medium of claim 25, further comprising:
computer program code for automatically performing the steps described in claim 25 based on a severity of the current intrusion, wherein the scripted response is at a severity level appropriate to the severity of the current intrusion.

35. The non-transitory computer usable medium of claim 25, further comprising:
computer program code for determining how many common nodes are found in the known intrusion path and the current intrusion path;
computer program code for, in response to a quantity of common nodes exceeding a predetermined quantity, automatically running scripted responses for all nodes in the current intrusion path; and computer program code for, in response to the quantity of common nodes being less than the predetermined quantity, prompting a security administrator to manually select a scripted response for each event node in the current intrusion path.

36. The non-transitory computer usable medium of claim 25, further comprising:

computer program code for notifying a remote receiver of the current intrusion; and computer program code for remotely initiating the scripted response in response to the remote notification of the current intrusion.

37. The method of claim 1, wherein the scripted response heals damage caused to the computer by the current intrusion.

38. The method of claim 1, wherein the scripted response prevents the current intrusion from causing any further damage to the computer.

* * * * *